United States Patent Office 3,052,591
Patented Sept. 4, 1962

3,052,591
RESINOUS PRODUCT, METHOD OF MAKING SAME, AND USE THEREOF
Piero Zanaboni, Milan, Italy, assignor to Montecatini, Società Generale per l'Industria Mineraria e Chimica, Milan, Italy, a corporation of Italy
No Drawing. Filed Apr. 2, 1958, Ser. No. 725,800
Claims priority, application Italy Apr. 14, 1957
10 Claims. (Cl. 156—332)

This invention relates to a resinous product, to the method of making the product, and to the use thereof.

More particularly, the invention relates to a process of copolymerizing styrene with a diallyl fumarate in the presence of carbon tetrachloride and of a catalyst of the peroxide type.

I have discovered that, upon adding a solvent solution of the aforesaid copolymerization product to one of the usual unsaturated polycarboxylic acid-polyhydroxy alcohol esters in admixture with a polymerizable compound containing a $CH_2=C$ group, compositions are obtained that are particularly suitable for impregnating and laminating various fibrous materials such as mats, fabrics or rovings from fiber glass, yarns and fabrics from natural and synthetic fibers such as cotton or nylon, as well as paper and other structures from cellulose fibers that can be impregnated.

After evaporation of the solvent, the impregnated materials are completely dry and non-sticky and lend themselves any time to lamination or molding. During this process, the impregnation composition is cross-polymerized by the action of heat and in the presence of suitable catalysts and thus converted into an insoluble and infusible binder.

It is, therefore, one of the objects of the herein-claimed invention to provide a new ternary copolymer with styrene and a diallyl fumarate as the principal constituents.

It is another object of the invention to provide a method of making this ternary copolymer.

It is a further object of the invention to provide an impregnating and laminating composition comprising said ternary copolymer and it is a still further object to provide structures laminated or molded by means of said composition.

These and other objects and advantages of the invention will be clearly discernible from the herein-following detailed description and the appended claims.

Monomeric styrene and monomeric diallyl fumarate have been previously copolymerized. However, the reaction cannot be readily controlled and ordinarily leads directly to insoluble and infusible products.

If the copolymerization is carried out in the presence of solvents, the reaction can be better controlled but the conversion yields of the monomers to the polymer are rather low.

Now I have found that, if the copolymerization of styrene and allyl fumarate is carried out in the presence of at least 10% (with respect to the total weight of the monomers) carbon tetrachloride and a catalyst of the peroxide type, very high conversion yields are obtained. I discovered that the carbon tetrachloride does not act simply as a solvent but, functioning as a moderator of the length of the forming polymeric chains, itself takes part in the copolymerization reaction, so that the resulting product must be considered as a ternary copolymer.

In fact, if the reaction product obtained in the presence of carbon tetrachloride, is precipitated by means of a non-solvent such as methyl alcohol or ligroine, purified by repeated dissolution in acetone and reprecipitation, and is then analyzed, the presence of chemically bound chlorine can be shown.

When operating in the aforementioned manner the particulars of which will be illustrated hereinbelow, I found that, upon completion of the reaction, that portion of the reaction product which cannot be precipitated with methyl alcohol or ligroine, is no longer in the monomeric state but already in the state of a low polymer. Actually, if the reaction product, obtained in the presence of carbon tetrachloride, instead of precipitating it with a non-solvent, is recovered as a dry residue by carefully vacuum evaporating the volatile portion, the amount obtained is at least equal to the sum of the amounts of monomers initially employed.

Consequently, when practicing the present invention, the precipitation of the reaction product with non-solvents is not even necessary since the reaction solution as such represents the most suitable form of the product for the purposes of this invention.

The allyl fumarates that are useful for the preparation of the copolymer are diallyl fumarate and dimethallyl fumarate.

The peroxide catalyst can be, e.g., acetyl peroxide, benzyl peroxide or cumene hydroperoxide.

The polymerization reaction is carried out by heating the mixture consisting of styrene and diallyl or dimethallyl fumarate at a ratio of 1 mol styrene per 0.5–10 mols diallyl or dimethallyl fumarate, carbon tetrachloride in an amount corresponding to at least 10% of total weight of the monomers, and benzoyl peroxide, at temperatures between 50° C. and 120° C., for a period of time varying from 3 to 100 hours. The progress of the reaction can be checked by controlling the viscosity of the reaction mixture until the desired value is attained.

If desired, most of the unreacted carbon tetrachloride can be distilled off after completion of the copolymerization reaction.

The other component of the composition of the present invention consists of one of the usual polymerizable unsaturated polyester resins such as a polyester resin prepared by reacting an unsaturated polycarboxylic acid with an aliphatic polyhydroxylic alcohol, in admixture with a polymerizable compound containing a $CH_2=C$ group.

In the preparation of the polymerizable unsaturated polyesters, unsaturated polycarboxylic acid, such as maleic, fumaric, itaconic acids, etc., can be used. If desired, these acids can be partially substituted with saturated polycarboxylic acids, such as phthalic, malonic, succinic, glutaric, sebacic, adipic, tetrachlorophthalic, endomethylene - tetrahydrophthalic, hexachloro-endomethylene-tetrahydrophthalic acids and the like.

Obviously, if readily available, the corresponding anhydrides can be used instead of the acids.

Of the polyhydroxylic alcohols, which can be reacted with dicarboxylic acids, glycols, such as ethylene, diethylene, propylene, dipropylene glycols and the like, are preferred.

The polyesterification reaction should be carried out until an acid number of about 35–40 is reached.

The polymerizable unsaturated polyesters are then mixed with a monomeric compound containing polymerizable $CH_2=C$ groups. The preferred ratio between the components of the mixture is about 25 to 35 parts of the monomeric compound per about 75 to 65 parts of the polymerizable unsaturated polyester.

As the monomeric compound, styrene or a side chain or ring-substituted styrene, such as α-methyl-styrene or dichloro-styrene, can be employed. Moreover, according to the present invention, allyl monomers, such as diallyl phthalate, carbonate, adipate or fumarate, triallyl cyanurate and the like, are preferably used.

The composition based on the afore-described unsaturated polymeric products, which is suitable for the preparation of pre-impregnated materials, is prepared according to the present invention, by mixing various amounts of the copolymer, obtained upon reacting styrene and an allyl fumarate, with a polymerizable unsaturated polyester resin in the presence of carbon tetrachloride, if desired, in solution of a solvent, preferably a solvent such as acetone.

The mixture must also contain a catalyst which is capable, together with the action of heat, of promoting the interpolymerization components of the mixture. The conventional catalysts of the peroxidic type are preferred, which are used in amounts ranging from 0.1–10% by weight, based on the total weight of the polymerizable composition. Examples of catalysts which can be used are benzoyl, acetyl, and lauryl peroxides as well as cumene hydroperoxide.

The addition of polymerization inhibitors, such as hydroquinone, pyrogallol, tert.p.-butyl pyrocatechin, etc., is sometimes desirable to control the polymerization rate.

The materials which lend themselves to pre-impregnation with the compositions of the present invention are fibrous material, such as glass fibers in the form of mats, fabrics or roving that are usually impregnated with polyester resins, natural and synthetic fibers, such as cotton, hemp, flax and nylon, in the form of mats, cloths, fabrics or yarns, and also paper of the type suitable for impregnation with resinous materials.

In practicing the present invention, the aforementioned fibrous structures can be impregnated by means of continuous or batch processes, whereby the solvent present in the impregnation composition is removed by drying the pre-impregnated materials at temperatures varying from 25° to 75° C., with or without the application of vacuum.

One advantage of the present invention lies in the fact that the component on the basis of a styrene-diallyl fumarate copolymer is furnished in the excess of carbon tetrachloride employed in the copolymerization reaction and, therefore, does not require any separation by precipitation with non-solvents; the unreacted carbon tetrachloride excess is sufficiently volatile to be readily removed from the pre-impregnated structure.

Another advantage of the present invention is the fact that the pre-impregnated materials, after drying, are perfectly dry and not sticky, and that the degree of plasticity of the impregnated structure can be readily modified by varying the ratio between the styrene-diallyl fumarate tetrachloride copolymer component and the polymerizable unsaturated polyester resin component. Calculated on a dry basis, this ratio can be varied from 5 to 95 parts of the first named component per 95 to 5 parts of the last named component. However, the preferred practical ratios are 80 parts of the styrene-diallyl fumarate-carbon tetrachloride copolymer component per 20 parts of the unsaturated polyester resin component.

Still another advantage of the present invention is that these pre-impregnated materials can be stored for extended periods, for example for four months or longer prior to the laminating or molding operations, without any premature gelation or any other changes of the resinous composition applied to the structure.

A still further advantage is that the resinous composition of this invention imparts to the laminated or molded articles obtained from structures pre-impregnated therewith, mechanical characteristics that are substantially superior to those obtainable from the usually employed unsaturated polyester resins.

The following examples are provided to illustrate the present invention, but in no way to limit the scope of the appended claims.

EXAMPLE 1

*Preparation of Styrene-Diallyl Fumarate-Carbon Tetrachloride Copolymer*

A reaction vessel is charged with the following materials:

295 parts (1.5 mols) of diallyl fumarate
70 parts (6.8 mols) of styrene
1600 parts of carbon tetrachloride
25 parts of benzoyl peroxide The mixture is refluxed at about 80° C. for 15 hours and the reaction product precipitated by adding 1000 parts of methyl alcohol.

The precipitated copolymer is dissolved in acetone and reprecipitated with methyl alcohol. This operation is repeated twice. 700 parts of dry copolymer are obtained.

Analysis shows that the product contains 2.25% of bound chlorine.

EXAMPLE 2

Proceeding as in Example 1, the mixture is heated for 20 hours. The yield, determined by precipitating a portion of the reaction product with ligroine, is 80 parts dry copolymer based on 100 parts of the mixture of monomeric styrene and diallyl fumarate.

Analysis indicates that the dry copolymer contains 2.89% of bound chlorine.

A portion of the products in form of a solution in the excess of carbon tetrachloride, is dried by means of a vacuum evaporation at 50° C. The yield is now of 101 parts of the dry copolymer per 100 parts of the mixture of monomeric styrene and diallyl fumarate.

EXAMPLE 3

255 parts diallyl fumarate
705 parts styrene
1600 parts carbon tetrachloride
25 parts benzoyl peroxide are reacted by refluxing at 80° C. for 20 hours.

About 1000 parts of carbon tetrachloride are distilled off and the residue is dissolved in 1000 parts of acetone.

EXAMPLE 4

1170 parts (11 mols) of diethylene glycol and 980 parts (10 mols) of maleic anhydride are placed in a reaction vessel. The mixture is gradually heated to 200° C. under a nitrogen atmosphere while stirring in order to remove the water that is gradually liberated during the esterification. Upon attaining an acid number of 35, the mixture is cooled and 800 parts of monomeric diallyl phthalate and 0.5 part of hydroquinone are added.

The product obtained is dissolved in 2600 parts of acetone.

EXAMPLE 5

2000 parts of a solution obtained according to Example 3 are mixed with 400 parts of a solution obtained according to Example 4.

20 parts of benzoyl peroxide are dissolved in the mixture which is then used for impregnating a fabric made from fiber glass. The impregnation is carried out by passing the fabric through an impregnation bath and then between rolls in order to eliminate excessive resin solution.

After removing the solvent by placing the pre-impregnated material for 70 minutes in an oven heated to 65° C., eleven layers of the pre-impregnated material are pressed for 6 minutes at a temperature of 115° C. between flat plates, provided with 3 mm. spacers, at a pressure of 20 kg./cm.$^2$.

The following table illustrates the mechanical characteristics of the laminate obtained in this manner, in comparison with the properties of a similar laminate made by impregnating the glass fabric with one of the usual unsaturated polyester resins.

| Characteristics of the laminate | Method | Bonding material | |
|---|---|---|---|
| | | polyester resin | pre-impregnation resin composition |
| glass content of the laminate, percent. | | 66 | 64 |
| bending strength, kg./cm.² | ASTM D 229-49 | 4,370 | 5,230 |
| tensile strength, kg./cm.² | ASTM D 229-49 | 2,690 | 2,600 |
| Izod notched resilience, kg./cm./cm. notch. | ASTM D 256-47 | 102 | 120 |

EXAMPLE 6

With the mixture prepared as in Example 5, the following sheets are impregnated: a kraft paper sheet, a decorative paper sheet for laminates and an overlay paper sheet. After removal of the solvent, the sheets placed on top of each other, in the aforementioned order, and are pressed for 5 minutes between flat specular plates, at a pressure of 20 kg./cm.² and a temperature of 115° C.

A decorative laminate, useful for lining furniture or walls, is obtained.

Similar compositions are obtained by replacing the diallyl fumarate by dimethallyl fumarate or the benzoyl peroxide catalyst of the examples by any other suitable catalyst previously set forth.

Obviously, the diethylene glycol maleic ester diallyl phthalate mixture of Example 4 can be replaced by any other of the unsaturated polyester mixtures with one of polymerizable monomeric compounds previously described.

I claim:

1. An impregnating composition comprising (1) a copolymer of styrene and a fumarate of the group consisting of diallyl and dimethallyl fumarate, said copolymer containing bound chlorine, and being prepared by copolymerization of the styrene and fumarate in the presence of a peroxide polymerization catalyst and carbon tetrachloride, (2) a polymerizable polyester resin of a glycol and an unsaturated polycarboxylic acid, (3) and a member of the group consisting of styrene, dichloro-styrene, methyl styrene, and allyl monomers, said glycol being taken from the group consisting of ethylene, diethylene, propylene, and dipropylene glycols; the unsaturated polycarboxylic acid being taken from the group consisting of maleic, fumaric and itaconic acids; the allyl monomer being taken from the group consisting of diallyl phthalate, diallyl carbonate, diallyl adipate, diallyl fumarate, and triallyl cyanurate, the composition being in solution in an organic solvent and a peroxide polymerization catalyst dissolved therein.

2. A process of making a reinforced article comprising coating the article with a composition comprising (1) a copolymer of styrene and a fumarate of the group consisting of diallyl and dimethallyl fumarate, said copolymer containing bound chlorine, and being prepared by copolymerization of the styrene and fumarate in the presence of a peroxide polymerization catalyst and carbon tetrachloride, (2) a polymerizable resin polyester of a glycol and an unsaturated polycarboxylic acid, (3) and a member of the group consisting of styrene, dichloro styrene, methyl styrene, and allyl monomers, said glycol being taken from the group consisting of ethylene, diethylene, propylene, and dipropylene glycols; the unsaturated polycarboxylic acid being taken from the group consisting of maleic, fumaric and itaconic acids; the allyl monomer being taken from the group consisting of diallyl phthalate, diallyl carbonate, diallyl adipate, diallyl fumarate, and triallyl cyanurate, the composition being in solution in an organic solvent, and a peroxide polymerization catalyst dissolved therein, and copolymerizing by applying heat and pressure.

3. A process comprising impregnating a plurality of sheets of fiber glass fabric with a composition comprising (1) a copolymer of styrene and a fumarate of the group consisting of diallyl and dimethallyl fumarate, said copolymer containing bound chlorine, and being prepared by copolymerization of the styrene and fumarate in the presence of a peroxide polymerization catalyst and carbon tetrachloride, (2) a polymerizable polyester resin of a glycol and an unsaturated polycarboxylic acid, (3) and a member of the group consisting of styrene, dichloro styrene, methyl styrene, and allyl monomers, said glycol being taken from the group consisting of ethylene, diethylene, propylene, and dipropylene glycols; the unsaturated polycarboxylic acid being taken from the group consisting of maleic, fumaric and itaconic acids; the allyl monomer being taken from the group consisting of diallyl phthalate, diallyl carbonate, diallyl adipate, diallyl fumarate, a triallyl cyanurate; the composition being in solution in an organic solvent, and a peroxide polymerization catalyst dissolved therein; removing the solvent, pressing the plurality of impregnated sheets together, and applying heat to copolymerize the three enumerated ingredients.

4. A process comprising impregnating a plurality of sheets of paper with a composition comprising (1) a copolymer of styrene and a fumarate of the group consisting of diallyl and dimethallyl fumarate, said copolymer containing bound chlorine, and being prepared by copolymerization of the styrene and fumarate in the presence of a peroxide polymerization catalyst and carbon tetrachloride, (2) a polymerizable polyester resin of a glycol and an unsaturated polycarboxylic acid, (3) and a member of the group consisting of styrene, dichloro styrene, methyl styrene, and allyl monomers, said glycol being taken from the group consisting of ethylene, diethylene, propylene, and dipropylene glycols; the unsaturated polycarboxylic acid being taken from the group consisting of maleic, fumaric and itaconic acids; the allyl monomer being taken from the group consisting of diallyl phthalate, diallyl carbonate, diallyl adipate, diallyl fumarate, and triallyl cyanurate; the composition being in solution in an organic solvent, and a peroxide polymerization catalyst dissolved therein; removing the solvent, pressing the plurality of impregnated sheets together, and applying heat to copolymerize the three enumerated ingredients.

5. A process of making a reinforced article comprising coating the article with a composition comprising (1) a copolymer of styrene and a fumarate of the group consisting of diallyl and dimethallyl fumarate, said copolymer containing bound chlorine, and being prepared by copolymerizing styrene and said fumarate in the presence of carbon tetrachloride in an amount which is at least ten percent of the total weight of the styrene and fumarate, by heating at about 50° to 120° C. in the presence of the peroxide polymerization catalyst, (2) a polymerizable resin polyester of a glycol and an unsaturated polycarboxylic acid, (3) and a member of the group consisting of styrene, dichloro styrene, methyl styrene, and allyl monomers, said glycol being taken from the group consisting of ethylene, diethylene, propylene, and dipropylene glycols; the unsaturated polycarboxylic acid being taken from the group consisting of maleic, fumaric, and itaconic acids; the allyl monomer being taken from the group consisting of diallyl phthalate, diallyl carbonate, diallyl adipate, diallyl fumarate, and triallyl cyanurate; the composition being in solution in an organic solvent, and a peroxide polymerization catalyst dissolved therein; and copolymerizing by applying heat and pressure.

6. An impregnating composition comprising (1) a copolymer of styrene and a fumarate of the group consisting of diallyl and dimethallyl fumarate, said copolymer containing bound chlorine, and being prepared by copolymerization of the styrene and fumarate in the presence of a peroxide polymerization catalyst and carbon tetrachloride, (2) a polymerizable resin polyester of diethylene glycol and maleic anhydride, and (3) diallyl phthalate, the composition being in solution in an organic solvent, and a peroxide polymerization catalyst dissolved in said solvent.

7. A process of making a reinforced article comprising coating the article with a composition comprising (1) a copolymer of styrene, a fumarate of the group consisting of diallyl and dimethallyl fumarate, said copolymer containing bound chlorine, and being prepared by copolymerization of the styrene and fumarate in the presence of a peroxide polymerization catalyst and carbon tetrachloride, (2) a polymerizable polyester resin of diethylene glycol and maleic anhydride, and (3) diallyl phthalate, the composition being in solution in an organic solvent, and a peroxide polymerization catalyst dissolved in said solvent, removing the solvent, and copolymerizing by applying heat and pressure.

8. The process of claim 7, the solvent being acetone.

9. The process of claim 2, the solvent being carbon tetrachloride.

10. A process comprising impregnating a plurality of sheets of fiber glass fabric with a composition comprising (1) a copolymer of styrene and a fumarate of the group consisting of diallyl and dimethallyl fumarate, said copolymer containing bound chlorine, and being prepared by copolymerization of the styrene and fumarate in the presence of a peroxide polymerization catalyst and carbon tetrachloride, (2) a polymerizable polyester resin of diethylene glycol and maleic anhydride, and (3) diallyl phthalate, the composition being in solution in an organic solvent, and a peroxide polymerization catalyst dissolved in said solvent, removing the solvent, pressing the plurality of impregnated sheets together, and applying heat to copolymerize the three enumerated ingredients.

References Cited in the file of this patent

UNITED STATES PATENTS 2,377,095 Muskat _____ May 29, 1945

FOREIGN PATENTS 644,287 Great Britain _____ Oct. 11, 1950
527,577 Canada _____ July 10, 1956

OTHER REFERENCES

Schildknecht: "Polymer Process," Interscience Publishers, Inc., New York, 1956, pages 24–25.

UNITED STATES PATENT OFFICE
CERTIFICATE OF CORRECTION

Patent No. 3,052,591                                      September 4, 1962

Piero Zanaboni

It is hereby certified that error appears in the above numbered patent requiring correction and that the said Letters Patent should read as corrected below.

In the heading to the printed specification, line 8, for "Claims priority, application Italy Apr. 14, 1957" read -- Claims priority, application Italy Apr. 4, 1957 --.

Signed and sealed this 2nd day of July 1963.

(SEAL)
Attest:

ERNEST W. SWIDER
Attesting Officer

DAVID L. LADD
Commissioner of Patents